April 6, 1943.  M. A. BOSTWICK  2,315,585
NETWORK DISTRIBUTION SYSTEM
Filed Oct. 13, 1939  2 Sheets-Sheet 1
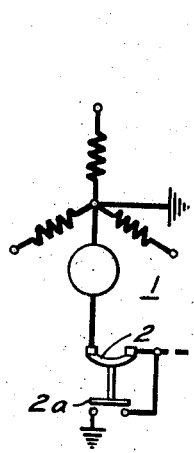
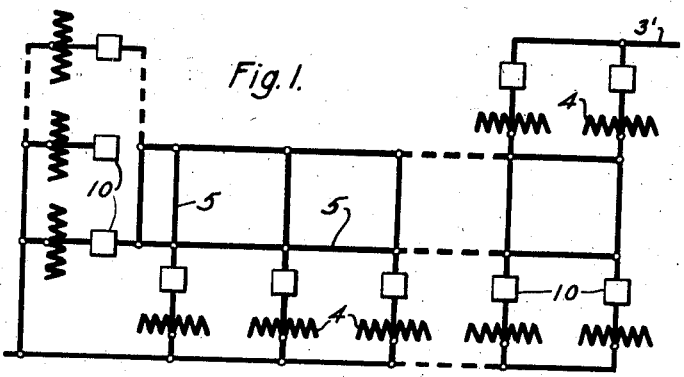
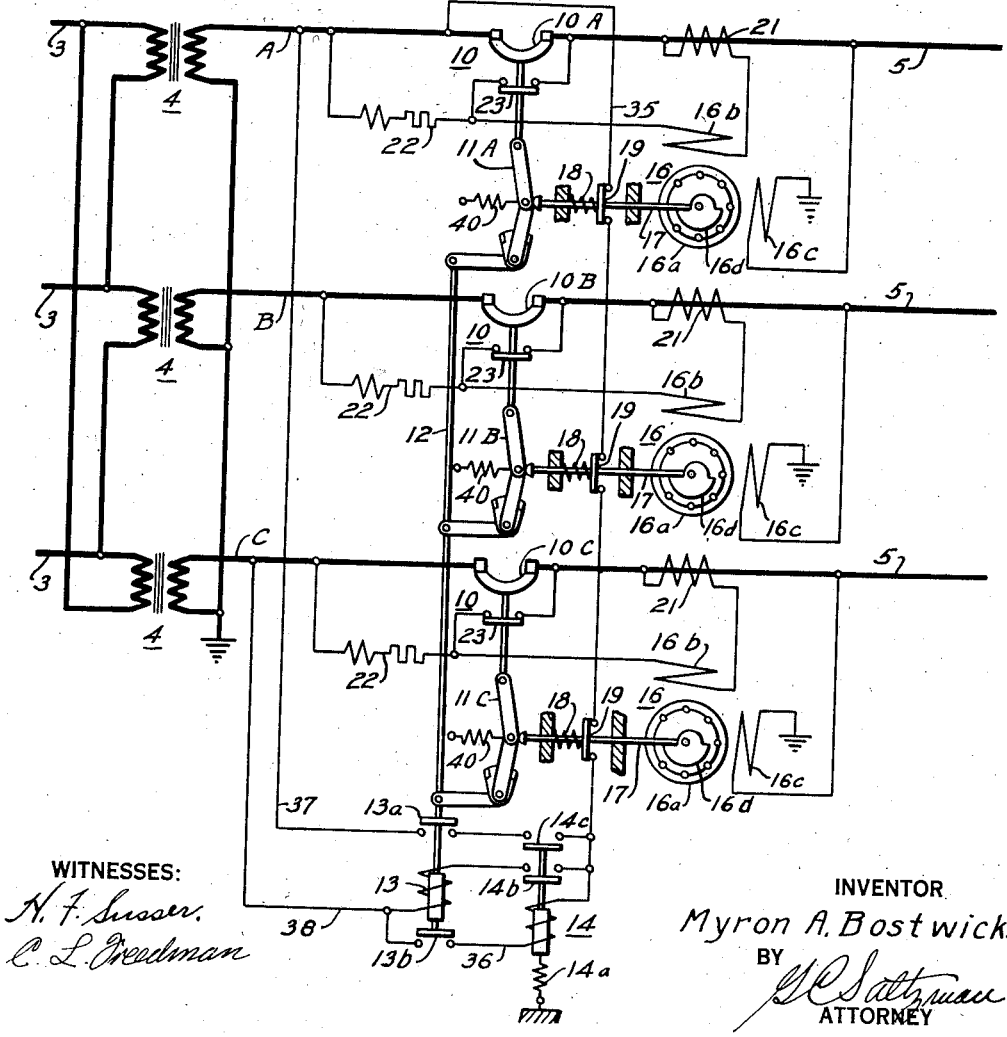
WITNESSES:
INVENTOR
Myron A. Bostwick
BY
ATTORNEY April 6, 1943.   M. A. BOSTWICK   2,315,585
NETWORK DISTRIBUTION SYSTEM
Filed Oct. 13, 1939   2 Sheets-Sheet 2
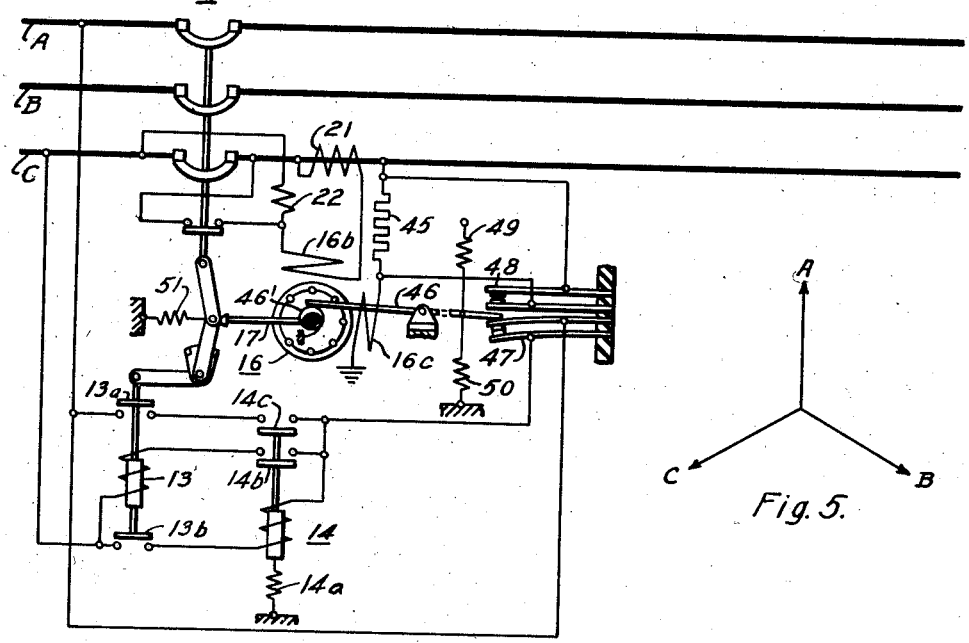
Fig. 3.
Fig. 5.
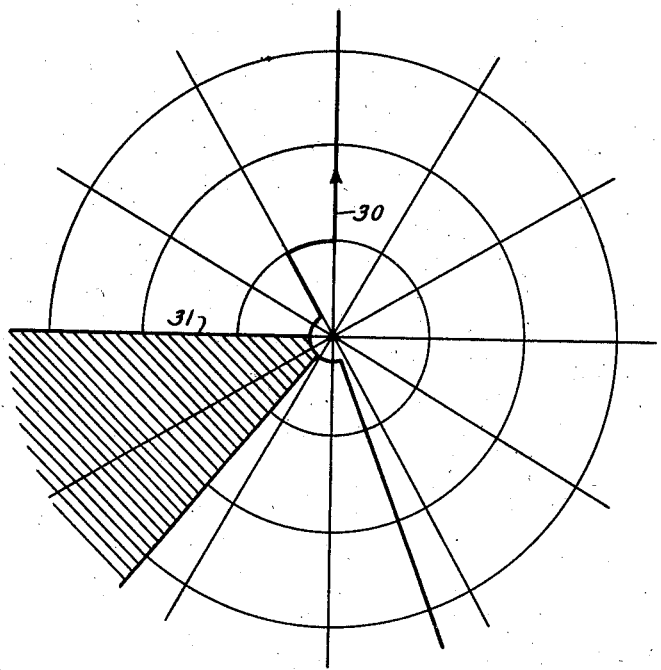
Fig. 4.
WITNESSES:
INVENTOR
Myron A. Bostwick
BY
ATTORNEY Patented Apr. 6, 1943

2,315,585

UNITED STATES PATENT OFFICE 2,315,585

NETWORK DISTRIBUTION SYSTEM

Myron A. Bostwick, Budd Lake, N. J., assignor to Westinghouse Electric & Manufacturing Company, East Pittsburgh, Pa., a corporation of Pennsylvania Application October 13, 1939, Serial No. 299,333

13 Claims. (Cl. 175—294)

My invention relates to alternating current systems of distribution, and particularly to systems of the network type. In such systems a distribution network is supplied with energization through one or more feeder circuits and step-down transformers, from one or more supply sources. The flow of power and energy between the step-down transformers and the network is controlled by means of automatic switches, known as network protectors.

It has heretofore been the practice in such systems to provide power directional relay apparatus to cause the network switches to trip open in response to a reverse energy flow from the network to the feeder, and to cause the network switch to reclose when the voltage on the feeder side is higher than the voltage on the network side and of such a phase relationship to the network voltage as to cause energy to flow from the feeder to the network upon closure of the network switch. The operation of comparing the voltages on the feeder side and on the network side of the network switch when such switch is open, is termed "phasing." The phasing operation prevents closure of the network switch if, in repairing a feeder fault, any two conductors of the feeder have been transposed, or if all three feeder conductors have been rotated 120° or 240°. Also, the phasing operation serves to prevent repeated opening and closing operations or "pumping" of the network switch in the event that the relationship of voltages on the feeder side and on the network side of the switch is improper.

One object of my invention is to provide a network protector which shall be controlled to open when the feeder is faulty, or when the main breaker of the feeder at the station source is opened to disconnect the feeder circuit entirely.

Another object of my invention is to provide a network protector that shall be controlled to remain closed during normal conditions regardless of the magnitude of energy flow in the forward direction, that is, from the feeder to the network, but that shall open under certain limited conditions of reverse energy flow from the network to the feeder.

Another object of my invention is to provide a simple control system for a network circuit breaker employing a motor that shall operate selectively as an energy directional relay, and that shall operate to control its degree of energization according to its direction of power flow, and that shall serve as a phasing relay when the circuit breaker is open, and that shall serve as a directripping device to trip the breaker when the direction of energy reverses through the breaker.

The manner in which the system operates in accordance with the principles of my invention is illustrated in the accompanying diagrams of a network system, in which:

Figure 1 is a simple schematic single line diagram of a network system in which one feeder supplies the network through several network protector units;

Fig. 2 is a diagram showing schematically a network circuit breaker construction and arrangement, together with the control apparatus therefor employing a torque motor;

Fig. 3 is a simple diagram of a network assembly for a network protector similar to that in Fig. 2, but modified to illustrate the manner in which the torque motor controls the extent of its energization according to the direction of energy flow;

Fig. 4 is a simple graph illustrating the characteristics of the torque motor in selectively controlling the opening of the network breaker in accordance with the reversal of energy flow through the breaker involving a predetermined relation between the reverse current and the system voltage; and Fig. 5 is a simple conventional vector diagram illustrating the relation of the three voltage vectors and the phase rotation of the system.

As shown in the diagram, referring to Fig. 1, a grounded neutral polyphase medium-voltage source 1 is connected by means of a feeder circuit breaker 2 to a feeder circuit 3. Suitable apparatus, shown diagrammatically as back contacts 2a of the feeder breaker 2, may be provided, if desired, for manually or automatically grounding one conductor of the feeder 3 or establishing an artificial phase-to-phase feeder fault whenever the feeder breaker 2 is open. With such contacts 2a, a ground responsive relay may be located adjacent the network protector for tripping the protector when the contacts 2a are closed. The feeder breaker 2 will be provided with usual fault-responsive apparatus for causing it to open in response to a fault on the feeder 3. As such apparatus forms no part of the present invention and is well-known in the art, it has not been shown in the drawing.

At each network protector unit, as in Fig. 2, a step-down transformer bank 4 is connected between the feeder 3 and a low-voltage distribution network 5. The transformer bank 4 is preferably connected with its high voltage windings in delta and its low voltage windings in star with neutral grounded, but other arrangements familiar to those skilled in the art may be used. The high-voltage windings of the transformer bank 4 are shown ungrounded. Although, for simplicity, only one feeder 3 may be required in Fig. 1, it will be understood that the network 5 is, or may be, supplied by other feeders 3', and each feeder is similarly connected to the network 5 by means of transformer banks in accordance with the usual practice indicated in Fig. 1.

As shown in Fig. 2, the transformer windings or the bank of transformers 4 are connected to the network 5 through the network breaker 10, which in this case, is shown as having separate bridging contacts, 10A, 10B and 10C with individual closing and tripping toggles 11A, 11B and 11C, that are mechanically connected through an interlock bar 12 in such manner that the tripping of any one breaker pole will pull out the other breaker poles through the action of its toggles on the interlock bar 12. The closing operation of the breaker is similarly effected through the interlock bar 12 and the individual toggles of the separate poles of the breaker, by a closing mechanism which may be illustrated as a simple closing coil 13. The circuit to the closing coil 13 is controlled by a voltage control relay 14 which is provided with a suitable calibrating mechanism 14a to control the operating point or value of voltage at which relay 14 will operate to close its contacts.

The operation of the breaker 10, through the closing coil 13 and its control relay 14, is controlled by main relays 16, each of which is essentially a torque motor having a rotor 16a and two windings 16b, and 16c, respectively. Various motors, such as two phase squirrel cage or wound rotor motors, are suitable. I have found that a squirrel-cage motor of the double-deck rotor type is satisfactory. Another acceptable construction is that employing a conductive drum rotor, such as a copper drum pressed over a core of iron laminae.

In the operation of this system, the circuit breaker may also be made of a single operating structure to control the bridging contacts for the circuits of the three phase conductors, in which case only one set of control equipment, including only one torque motor would be employed. An example of this modification is shown in Fig. 3.

With the arrangement that I have illustrated in Fig. 2, however, in which each pole is individually operable, only one closing mechanism is employed for the three separate poles of the breaker, but each pole is provided with its own torque motor to determine when the breaker should be closed or opened and to permit the closure of the corresponding pole at that time and to open the corresponding pole of the breaker upon occurrence of conditions that establish a reverse flow of energy of a particular type.

The torque motor 16, in addition to its rotor and its two windings, is also provided with a cam 16d by means of which a toggle on the circuit breaker assembly is tripped. In one embodiment, the cam operates a trip rod 17 against a biasing spring 18, to trip the associated toggle 11A, 11B or 11C, when the breaker is closed, or to prevent energization of the closing circuits when the breaker is open and conditions are not proper to permit its closure.

As shown in Fig. 2, each trip rod 17 associated with each pole of the breaker carries a bridging contact 19, which the spring 18 normally biases to bridge a pair of spaced contacts in the circuit of the operating winding of relay 14.

In order to enable torque motors 16 to operate as a directional device, the windings 16b thereof are energized in accordance with the currents flowing in the respective phase conductors 5 by means of suitable current transformers 21.

When the circuit breaker is open, the windings 16b will serve as phasing circuit windings, being connected across the open breaker contacts, and will be energized in accordance with the relative voltage condition on the transformer and network conductors 5. In order to limit the voltage that might be impressed upon the windings 16b of the torque motor under this condition, an external impedance 22 is included in circuit with each winding 16b. By connecting the winding 16b as shown, with one terminal of the secondary of each current transformer connected to one conductor of the network circuit, the impedance of the secondary winding of the current transformer 21 may also be utilized to limit the voltage that might be impressed upon the winding 16b when the circuit breaker is open. The impedance angle of the impedance 22 is so selected that the motor 16 operates properly in reverse directions for normal and reverse current flow through the phasing circuit.

In order to render the winding 16b of the torque motor more sensitive to circuit current when the circuit breaker is closed, to permit a more sensitive responsiveness to determine the direction of energy flow, each pole of the breaker 10 is provided with a front auxiliary contact 23 which is disposed to bridge and short circuit the external impedance 22 in the circuit of the motor winding 16b when the breaker is closed.

Selective directional operation of the torque motor 16 is obtained through the winding 16c thereof which is energized in accordance with the voltage of the network conductors 5.

In the graph shown in Fig. 4, I have illustrated generally the relationship between the network voltage and the current through the breaker which governs whether the breaker shall remain closed or shall open. Distances measured radially from the center of Fig. 4 correspond to current magnitudes. The vertical reference vector 30 represents network voltage, and the shaded region 31 represents the region of reverse-energy current in which the network breaker shall be open. Thus, when the current vector terminates anywhere within the area 31, the condition in the system that causes a reversal of energy of such character is undesirable and indicates a faulty condition, in the feeder of such character that the feeder should be disconnected from the network. That is, if the vector 30 represents a phase-to-neutral voltage, the phase current flowing to a fault on the feeder generally lags the vector 30, reversed by about 40 to 90 degrees. When the current vector terminates in any other area of the graph outside of the area 31, the circuit breaker may remain closed to connect the feeder circuit and the network. The area 31 represents generally the position that would be occupied by a vector corresponding to a fault current supplied to a feeder from the network. It will be observed that any current vector terminating in the area 31 corresponds to a reverse energy with the current having a substantial angle of lag, or lower power factor. That power factor will normally correspond to the impedance characteristics of the feeder and thus automatically provides a method of detecting fault currents so that it may be utilized to provide a maximum torque upon the electroresponsive device that is employed to detect the presence of such fault currents in the system.

In accordance with well known principles, the constants of the energizing circuits of the motors 16 may be so selected that the motors deliver substantial torques under energizing conditions corresponding to the shaded portion of Fig. 4 for different connections of the voltage windings 16c to the phase conductors of the network 5. A specific connection is illustrated in Fig. 2 wherein each voltage winding 16c is connected to the same phase conductor which energizes the related current winding 16b. As explained above, under fault conditions on the feeder, the voltage across the winding 16c leads the current in the associated phase conductor by about 40° to 90°, and the motor is so wound that the resulting torque trips the circuit breaker 10.

For the purpose of this discussion, the phase rotation may be assumed to be in the order A, B, C as illustrated in Fig. 5.

When the system condition is such that the transformers 4 are deenergized due to the deenergization of the feeder circuit at its station source and the breaker 10 is open, each of the torque motors 16 will be energized with full voltage on its voltage winding 16c. At the same time a reverse current flows through the winding 16b which operates as a phasing winding to maintain the contacts 18, 19 open. Upon closure of the main breaker of the feeder, the transformer bank 4 will be energized and the winding 16b of each torque motor will be energized according to the voltage across the contact terminals of its associated breaker pole. If the conductors on both sides of the breaker are of the proper phase relationship and the voltage on the transformer side of the breaker is higher than that of the network side, the current winding 16b of the torque motors 16 will be energized in such direction as to tend to move the relay to the terminal position indicated, which is the closure-permitting position to permit the closure of the breaker. Under such conditions the trip rod 17 associated with each pole will be moved to its terminal position at which each associated switch 19 will be closed by the biasing spring 18. All of the switches 19 are connected in series between the operating coil of the voltage relay 14 and any phase conductor, which in this case is the conductor A connected to the transformer bank 4. The voltage relay 14 is adjusted to pick up and to operate at some predetermined value of the transformer voltage which should be approximately the usual operating voltage of the network 5. The voltage relay 14 will thereupon operate to close its switches 14b and 14c upon being energized through the circuit proceeding from main phase conductor A, conductor 35, the three switches 19 on the trip rods all connected in series, the operating coil of relay 14, and conductors 36 and 38 to the main phase conductor C. Relay switch 14c completes a holding circuit for the relay 14 through a back contact 13a on the closing interlock rod 12 and conductor 37 to the main phase conductor A.

Switch 14b of relay 14 completes an energizing circuit to the closing coil 13 which thereupon operates to close all three poles of the breaker.

Upon closure of the breaker, the back contact 13a is opened to open the holding circuit for the voltage relay 14 and the back contact 13b is opened to open the original energizing circuit of the relay 14. Thus when the breaker 10 closes it disconnects the voltage relay 14 from the system.

The manner in which the back contacts 13a and 13b operate to open their respective circuits after the circuit breaker has reached an assured closing position is well known in the art, and I have, therefore, not illustrated the structural features by means of which that operation is accomplished.

When the breaker 10 closes, each pole closes its auxiliary contact switch 23 which short circuits the impedance device 22 in circuit with the current winding 16b of associated torque motor 16.

Each torque motor now operates as a directional device having one winding 16c energized from voltage and the other winding 16b energized according to the current in the associated phase conductor. So long as the current in that conductor is such as to bear a relationship to the voltage, which it will bear with power in a forward direction, the torque motor will be biased to the position which it occupies in Fig. 2 to permit the trip rods to rest in the positions shown. Upon occurrence of abnormal conditions in the feeder circuit that cause a reversal of energy flow from the network to the feeder, such reverse current will fall in the region indicated by the area 31 in Fig. 4, and the torque motors 16 will be energized to rotate their cams 16d in a counter-clockwise direction to their other terminal positions. These cams actuate the trip rods 17 to push the toggles 11A, 11B and 11C over center, so that the over-center springs 40 associated with each toggle will move the toggle to full open position to disconnect the network from the transformer.

In the circuit arrangement shown in Fig. 3, provision is made whereby the torque motor shall selectively control the degree of its energization according to its direction of movement so that it may develop a more powerful operating torque to trip the breaker after its period of operation as a detecting relay. A modified circuit breaker 10' is illustrated in Fig. 3. This circuit breaker has all three poles on a common support for actuation by a single torque motor 16.

In the arrangement shown in Fig. 3 the voltage winding 16c is provided with an impedance which may be a resistor 45 in its circuit to limit the current applied to the winding 16c while the relay is functioning as an energy directional relay.

Assuming the circuit breaker 10' to be open, when energy is in the forward direction the torque motor operates through a cam 46' and a suitable leverage device 46 to close a switch 47 to complete the energizing circuit of the voltage relay 14. Since the voltage relay 14 controls the closing circuit for the circuit breaker, the circuit breaker closes.

Upon occurrence of abnormal conditions with reverse flow of energy, the torque motor 16 will move the cam 46' in a counter-clockwise direction to open the switch 47 and to close a normally open switch 48 during the initial portion of the cam movement. Switch 48 is arranged to bridge the resistor 45 and when closed will short circuit that resistor, thereby permitting the full voltage of the phase conductor C to be impressed upon the voltage winding 16c of the torque motor 16 during the remaining portion of its rotation to enable the torque motor to develop a greater torque to trip the circuit breaker. Two adjustable springs 49 and 50 are provided in connection with the leverage device 46 to provide an adjustable setting for the operation of the torque motor 16 when it functions as a reverse energy relay. In that case the leverage 46 operates as a brake to restrain the movement of the torque motor in response to the reverse energy flow. By the adjustment of the pressure of the brake 46 on the torque motor, the operating setting of the torque motor may be controlled.

If desired, each torque motor may be provided with a spring 51 (Fig. 3) for biasing the torque motor into its circuit breaker closing position. This corresponds in Fig. 3 to a spring which biases the motor 16 in a clockwise direction. Such springs, if employed in the motors of Fig. 2 would assist the springs 12 in closing the contacts 19 when the motors are deenergized.

For purposes of illustration the motor 16 in Fig. 3 is illustrated as a single phase motor controlled by single phase quantities derived from the distribution system. If desired, however, the motor 16 may be a polyphase motor responsive to the condition of all phases of the distribution system. For example, the motor 16 of Fig. 3 may have three sets of coils operating on a single rotor in the manner described in the Parsons Patent No. 2,013,836, issued September 10, 1935. By energizing each phase of the motor from a separate phase of the distribution system in accordance with the principles discussed in connection with Fig. 3, polyphase control of the circuit breaker is obtained.

Although I have described my invention with reference to certain specific embodiments thereof, it is obvious that numerous modifications thereof are possible. Therefore, my invention is not to be restricted except as required by the appended claims when interpreted in view of the prior art.

I claim as my invention:

1. In a network distribution system, an electrical circuit, circuit interrupting means for operatively connecting portions of said electrical circuit, and means for tripping said circuit interrupter comprising a rotary electrical motor of the reversible, continuously rotatable type, mechanical connection means for transmitting a tripping impulse from said rotary electrical motor to said circuit interrupting means, and means connecting said rotary electrical motor to said electrical circuit for operation in a direction dependent on the direction of energy flow in said electrical circuit for rotating to trip said circuit interrupter through said mechanical connection means.

2. In a network distribution system, an electrical circuit, circuit interrupting means for operatively connecting portions of said electrical circuit, and means for tripping said circuit interrupter comprising a rotary electrical motor of the reversible, continuously rotatable type having a first winding energized in accordance with a voltage condition of said electrical circuit and having a second winding energized in accordance with a current condition in said electrical circuit for rotation in a direction dependent on the direction of energy flow in said circuit, and mechanical connection means for transmitting a tripping impulse from said rotary electrical motor to said circuit interrupting means in response to a reversal in the normal direction of energy flow in said electrical circuit.

3. In a network distribution system, a main electrical circuit, circuit interrupting means having an open condition and a closed condition for operatively disconnecting and connecting portions of said main electrical circuit, and control means for changing the condition of said circuit interrupting means including a control circuit for controlling the sensitivity of said control means, means operatively connecting said control circuit for energization from said main electrical circuit in either of said conditions of said circuit interrupting means, and means controlled by the condition of said circuit interrupting means for varying said control circuit to modify the sensitivity of said control means.

4. In a network distribution system, a main electrical circuit, circuit interrupting means having an open condition and a closed condition for operatively disconnecting and connecting portions of said main electrical circuit, and control means for changing the condition of said circuit interrupting means including a control circuit for controlling the sensitivity of said control means, means operatively connecting said control circuit for energization in accordance with the voltage across a pole of said circuit interrupting means when said circuit interrupting means is in its open condition, and in accordance with a current in said main electrical circuit when said circuit interrupting means is in its closed condition, and means controlled by the condition of said circuit interrupting means for varying said control circuit to modify the sensitivity of said control means.

5. In a network distribution system, a main electrical circuit, circuit interrupting means having an open condition and a closed condition for operatively disconnecting and connecting portions of said main electrical circuit, and control means for operating said circuit interrupting means between said conditions including motive means for actuating said interrupting means, means for energizing said motive means in accordance with a condition of said main electrical circuit, and means effective after initiation but before completion of a movement of said motive means for varying the energization of said motive means.

6. In a network distribution system having a main electrical circuit and circuit interrupting means for operatively connecting portions of said main electrical circuit, means energized in accordance with a variable quantity present in said main electrical circuit for directly tripping said circuit interrupting means, and means effective a predetermined time after initiation but before completion of an operation of said tripping means for increasing the energization thereof.

7. In a network distribution system having a main electrical circuit and circuit interrupting means for operatively connecting portions of said main electrical circuit, means for directly tripping said circuit interrupting means including a circuit containing an energizing winding for said tripping means, an impedance included in said circuit, and means effective after initiation but before completion of an operation of said tripping means for rendering said impedance ineffective.

8. In a network distribution system having a main electrical circuit and circuit interrupting means for operatively connecting portions of said main electrical circuit, means for directly tripping said circuit interrupting means, means responsive to the presence of normal closing voltages across the poles of said circuit interrupting means when circuit interrupting means is open for closing said circuit interrupting means, and means effective after initiation but before completion of an operation of said tripping means for increasing the energization thereof.

9. In a polyphase network distribution system, a plurality of polyphase electrical circuits, circuit interrupting means for connecting and disconnecting corresponding phase conductors of said circuits, and means for controlling the closure of said circuit interrupting means including a plurality of independent phasing means each responsive to a phasing condition across a separate pole of said circuit interrupting means for independently preventing closure of said circuit interrupting means, each of said phasing means including separate translating means effective for controlling the closure of said circuit interrupting means in accordance with the energization of the associated phasing means, and means rendering each of said translating means effective for tripping said circuit interrupting means responsive to predetermined conditions of said electrical circuits.

10. In a network system, the combination with a network, a feeder circuit and a circuit breaker for connecting and disconnecting the feeder circuit and the network, of a reversible torque motor for controlling the operation of the breaker, said motor having two windings, means connecting one of said windings for energization in accordance with a voltage of the network, means connecting the other winding across the breaker terminals of one phase conductor to serve as a phasing circuit, and means for controlling the connections of said windings when said circuit breaker is closed for rendering said windings effective under predetermined conditions of energization of said feeder circuit for operating said torque motor to trip said circuit breaker.

11. In a network system, the combination with a network, a feeder circuit and a circuit breaker for connecting and disconnecting the feeder circuit and the network, of a reversible torque motor for controlling the operation of the breaker, said motor having two windings, one being energized by a voltage of the network, and the other winding being connected across the breaker terminals of one phase conductor to serve as a phasing circuit, and an impedance for one winding of the motor for use only during the phasing period, and means operable by the breaker in closing for rendering the impedance ineffective, whereby the energization of the motor is increased when the breaker is closed.

12. In a network system, the combination with a network, a feeder circuit and a circuit breaker for connecting and disconnecting the feeder circuit and the network, of a reversible torque motor for controlling the operation of the breaker, said motor having two windings, means for energizing one of said windings in accordance with a voltage of the network, and means for energizing the other winding in accordance with the voltage across the breaker terminals of one phase conductor to serve also as a phasing circuit, and means in the phasing circuit and associated with the network to serve as an impedance device in the current coil circuit during the phasing operation when the breaker is open, and to serve as a current transforming device when the breaker is closed.

13. In a network system, the combination with a network, a feeder circuit and a circuit breaker for connecting and disconnecting the feeder circuit and the network, of a reversible torque motor of the continuously rotatable type for controlling the operation of the breaker, said motor having two windings, means for energizing one of said windings in accordance with a voltage of the network, and means for energizing the other winding in accordance with the voltage across the breaker terminals of one phase conductor to serve also as a phasing circuit, an impedance for the potential coil, and means operable by the torque motor to render ineffective the impedance upon occurrence of a condition requiring tripping of the breaker, thereby to increase the energization of the motor in the tripping direction and to increase the torque available in the motor for the tripping operation.

MYRON A. BOSTWICK.